United States Patent
Nakajima et al.

(10) Patent No.: US 10,203,804 B2
(45) Date of Patent: Feb. 12, 2019

(54) INPUT DEVICE, AND CONTROL METHOD AND PROGRAM THEREFOR

(71) Applicant: ALPS ELECTRIC CO., LTD., Tokyo (JP)

(72) Inventors: Satoshi Nakajima, Miyagi-ken (JP); Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 44 days.

(21) Appl. No.: 14/940,019

(22) Filed: Nov. 12, 2015

(65) Prior Publication Data
US 2016/0147373 A1 May 26, 2016

(30) Foreign Application Priority Data

Nov. 26, 2014 (JP) ................................. 2014-238416
Dec. 22, 2014 (JP) ................................. 2014-259520
Dec. 22, 2014 (JP) ................................. 2014-259521

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
CPC ........ G06F 3/041; G06F 3/044; G06F 3/0487; G09G 5/00
See application file for complete search history.

(56) References Cited

U.S. PATENT DOCUMENTS

| | | | |
|---|---|---|---|
| 5,229,551 A | 7/1993 | McDermott et al. | |
| 8,564,546 B1 * | 10/2013 | Birch | G06F 3/0416 178/18.01 |
| 2008/0158169 A1 * | 7/2008 | O'Connor | G06F 3/0418 345/173 |
| 2010/0085322 A1 * | 4/2010 | Mamba | G06F 3/044 345/173 |
| 2010/0142830 A1 * | 6/2010 | Yahata | G06F 3/042 382/209 |
| 2010/0214259 A1 * | 8/2010 | Philipp | G06F 3/0416 345/174 |
| 2012/0098766 A1 * | 4/2012 | Dippel | G06F 3/0416 345/173 |

(Continued)

FOREIGN PATENT DOCUMENTS

JP 2009-258903 11/2009

*Primary Examiner* — Lunyi Lao
*Assistant Examiner* — Johny Lau
(74) *Attorney, Agent, or Firm* — Beyer Law Group LLP

(57) ABSTRACT

A degree of approach of an object in positions of a detection surface is periodically detected by a sensor unit, a group of detection data items indicating a result of the detection is generated in every one of cycles. The group of detection data items generated in the sensor unit is acquired in every one of cycles by a detection data acquisition unit. In the error determination unit, it is determined in every one of cycles whether there is an error in the detection operation due to noise based on a degree of a temporal change and a degree of a positional change in the detection data. When it is determined by the error determination unit that there is an error in the detection operation of one cycle, a process of acquiring the detection data generated in the one cycle is skipped in the detection data acquisition unit.

13 Claims, 10 Drawing Sheets

(56) References Cited

U.S. PATENT DOCUMENTS

| | | | |
|---|---|---|---|
| 2013/0154983 A1* | 6/2013 | Christiansson | G06F 3/0416 |
| | | | 345/173 |
| 2015/0199068 A1 | 7/2015 | Arima | |
| 2015/0212623 A1 | 7/2015 | Hatano et al. | |
| 2015/0339021 A1* | 11/2015 | Duteil | A63F 13/06 |
| | | | 345/156 |
| 2015/0355740 A1 | 12/2015 | Yumoto et al. | |

* cited by examiner

FIG. 2A

|   | 0 | 1 | ... | n | n+1 | ... | N-1 |
|---|---|---|---|---|---|---|---|
| 0 | DI[0][0] | DI[1][0] | ... | DI[n][0] | DI[n+1][0] | ... | DI[N-1][0] |
| 1 | DI[0][1] | DI[1][1] | ... | DI[n][1] | DI[n+1][1] | ... | DI[N-1][1] |
| ⋮ | ⋮ | ⋮ | | ⋮ | ⋮ | | ⋮ |
| m | DI[0][m] | DI[1][m] | ... | DI[n][m] | DI[n+1][m] | ... | DI[N-1][m] |
| ⋮ | ⋮ | ⋮ | | ⋮ | ⋮ | | ⋮ |
| M | DI[0][M-1] | DI[1][M-1] | ... | DI[n][M-1] | DI[n+1][M-1] | ... | DI[N-1][M-1] |

FIG. 2B

|   | 0 | 1 | ... | n | n+1 | ... | N-1 |
|---|---|---|---|---|---|---|---|
| 0 | OLD[0][0] | OLD[1][0] | ... | OLD[n][0] | OLD[n+1][0] | ... | OLD[N-1][0] |
| 1 | OLD[0][1] | OLD[1][1] | ... | OLD[n][1] | OLD[n+1][1] | ... | OLD[N-1][1] |
| ⋮ | ⋮ | ⋮ | | ⋮ | ⋮ | | ⋮ |
| m | OLD[0][m] | OLD[1][m] | ... | OLD[n][m] | OLD[n+1][m] | ... | OLD[N-1][m] |
| ⋮ | ⋮ | ⋮ | | ⋮ | ⋮ | | ⋮ |
| M | OLD[0][M-1] | OLD[1][M-1] | ... | OLD[n][M-1] | OLD[n+1][M-1] | ... | OLD[N-1][M-1] |

INPUT DEVICE, AND CONTROL METHOD AND PROGRAM THEREFOR

CLAIM OF PRIORITY

This application claims benefit of Japanese Patent Application No. 2014-238416 filed on Nov. 26, 2014, 2014-259520 filed on Dec. 22, 2014, and 2014-259521 filed on Dec. 22, 2014, which are hereby incorporated by reference.

BACKGROUND OF THE INVENTION

1. Field of the Invention

The present invention relates to an input device that inputs information according to an approach state of an object using a change in capacitance or the like, and a control method and a program therefor, and more particularly, to an input device that inputs information according to an operation of a finger, a pen, or the like in various information devices such as a computer.

2. Description of the Related Art

Since a sensor that detects a change in capacitance can detect approach of an object (for example, a finger or a pen) with a simple configuration, the sensor is widely used for user interface devices of various electronic devices, such as touch pads of note type computers or touch panels of smart phones.

In International Publication No. WO 2012/117437, a touch panel device including a touch panel unit in which a plurality of electrodes are arranged is described. A scan electrode is determined from among the plurality of electrodes of the touch panel unit, and the touch panel unit is operated for the determined scanning electrode. Accordingly, a measurement value reflecting a change in capacitance of each electrode is acquired, and it is detected whether the touch panel unit is touched based on the acquired measurement value.

However, since such an input device is configured to be able to sensitively detect an object approaching a detection surface of a sensor, there is a problem in that the sensor is particularly susceptible to electromagnetic noise from the outside. For example, in the case of the above-described capacitive sensor, since a change in capacitance of an electrode caused by approach of an object is detected as a change in a small amount of charge, there is a problem in that erroneous detection of coordinates or a contact state of an object easily occurs due to an influence of noise.

SUMMARY OF THE INVENTION

The present invention provides an input device, and a control method and a program therefor capable of reducing an influence of detection error due to noise.

A first aspect of the present invention relates to an input device that inputs information according to a state of approach of an object to a detection surface. This input device includes: a sensor unit configured to detect a degree of the approach of the object at each of a plurality of positions of the detection surface and generate detection data indicating a result of the detection for each of the plurality of positions; a sensor control unit configured to control the sensor unit so that the sensor unit performs a periodic detection operation of generating the detection data in the plurality of positions in every one of cycles; a detection data acquisition unit configured to acquire a plurality of detection data generated for the plurality of positions in every one of cycles of the detection operation; and an error determination unit configured to determine, in every one of cycles, whether or not there is an error in the detection operation due to noise based on a degree of a temporal change and a degree of a positional change in the detection data. When the error determination unit determines that there is an error in the detection operation in one cycle, the detection data acquisition unit skips a process of acquiring the detection data generated in the one cycle.

According to the above configuration, a plurality of detection data items indicating a degree of approach of an object at a plurality of positions on the detection surface is periodically generated by the sensor unit. In every one of cycles of a periodic detection operation of the sensor unit, the plurality of detection data items generated for the plurality of positions is acquired by the detection data acquisition unit. Further, in the error determination unit, it is determined in every one of cycles whether or not there is an error in the detection operation due to noise based on the degree of the temporal change and the degree of the positional change in the detection data. When it is determined by the error determination unit that there is an error in the detection operation of one cycle, a process of acquiring the detection data generated in the one cycle is skipped in the detection data acquisition unit.

Thus, it is accurately determined whether or not there is an error in the detection operation due to noise based on the degree of the temporal change and the degree of the positional change in the detection data. Further, since the process of acquiring the detection data generated in the cycle in which it is determined that there is an error in the detection operation due to noise is skipped, it is possible to effectively reduce an influence of the detection error due to noise.

Preferably, the error determination unit may calculate an evaluation value according to a degree to which the degree of the temporal change in the detection data further changes according to a position in every one of cycles of the detection operation, and determine that there is an error in the detection operation when the calculated evaluation value satisfies a predetermined error determination condition.

In this case, the error determination unit may calculate, for at least some of the plurality of positions, the evaluation value according to a difference between temporal change amounts of the detection data in a plurality of successive cycles of the detection operation, the difference being a difference between the temporal change amount at one position on the detection surface and the temporal change amount at a position adjacent to the one position.

Preferably, the error determination unit may calculate an evaluation value according to a degree to which the degree of the positional change in the detection data temporally changes in every one of cycles of the detection operation, and determine that there is an error in the detection operation when the calculated evaluation value satisfies a predetermined error determination condition.

In this case, the error determination unit may calculate, for at least some of the plurality of positions, the evaluation value according to an amount by which a difference between the detection data in one position of the detection surface and the detection data at a position adjacent to the one position changes in a plurality of successive cycles of the detection operation.

Preferably, the error determination unit may compare a sum of the evaluation values calculated for at least some of the plurality of positions with a predetermined threshold value, and determine whether or not there is an error in the detection operation according to a result of the comparison.

Accordingly, a change in the detection data locally generated due to noise can be easily recognized.

Preferably, the error determination unit may compare respective evaluation values calculated for at least some of the plurality of positions with a predetermined threshold value, and determine that there is an error in the detection operation when the number of positions satisfying a condition of a predetermined magnitude relationship reaches a predetermined number as a result of the comparison.

Accordingly, when only detection data of a very small region is greatly changed due to noise, a determination as an error in the detection operation is difficult.

Preferably, the error determination unit may calculate, for at least some of the plurality of positions, a first evaluation value according to a difference between the detection data in one position of the detection surface and the detection data at a position adjacent to the one position in every one of cycles of the detection operation, and a second evaluation value according to a temporal change amount of the detection data in two successive cycles of the detection operation, and determine that there is an error in the detection operation when the first evaluation value and the second evaluation value that are calculated satisfy a predetermined error determination condition.

In this case, the error determination unit may determine whether or not there is an error in the detection operation based on a result of comparing a sum of the first evaluation values calculated for at least some of the plurality of positions with a first threshold value, and a result of comparing a sum of the second evaluation values calculated for at least some of the plurality of positions with a second threshold value.

Alternatively, the error determination unit may determine that there is an error in the detection operation on the condition that the number of positions satisfying a condition of a predetermined magnitude relationship reaches a predetermined number in a result of comparing the first evaluation value calculated for each of at least some of the plurality of positions with a first threshold value and/or that the number of positions satisfying the condition of the predetermined magnitude relationship reaches the predetermined number in a result of comparing the second evaluation value calculated for each of at least some of the plurality of positions with a second threshold value.

A second aspect of the present invention relates to a method in which a computer controls an input device that includes a sensor unit that detects a degree of approach of an object at a plurality of positions of a detection surface and generates detection data indicating a result of the detection for each of the plurality of positions, and inputs information according to a state of the approach of the object to the detection surface. The method of controlling an input device including steps of: controlling the sensor unit so that the sensor unit performs a periodic detection operation of generating the detection data in the plurality of positions in every one of cycles; acquiring a plurality of detection data items generated for the plurality of positions in every one of cycles of the detection operation; and determining, in every one of cycles of the detection operation, whether or not there is an error in the detection operation due to noise based on a degree of a temporal change and a degree of a positional change in the detection data. When it is determined in the step of determining the error that there is an error in the detection operation in one cycle, the step of acquiring the detection data includes skipping a process of acquiring the detection data generated in the one cycle.

Preferably, the step of determining an error may include calculating an evaluation value according to a degree to which the degree of the temporal change in the detection data further changes according to a position in every one of cycles of the detection operation, and determining that there is an error in the detection operation when the calculated evaluation value satisfies a predetermined error determination condition.

In this case, the step of determining an error may include calculating, for at least some of the plurality of positions, the evaluation value according to a difference between temporal change amounts of the detection data in a plurality of successive cycles of the detection operation, the difference being a difference between the temporal change amount in one position of the detection surface and the temporal change amount at a position adjacent to the one position.

Preferably, the step of determining an error may include calculating an evaluation value according to a degree to which the degree of the positional change in the detection data temporally changes in every one of cycles of the detection operation, and determining that there is an error in the detection operation when the calculated evaluation value satisfies a predetermined error determination condition.

In this case, the step of determining an error may include calculating, for at least some of the plurality of positions, the evaluation value according to an amount by which a difference between the detection data in one position of the detection surface and the detection data at a position adjacent to the one position changes in a plurality of successive cycles of the detection operation.

Preferably, the step of determining an error may include comparing a sum of the evaluation values calculated for at least some of the plurality of positions with a predetermined threshold value, and determining whether there is an error in the detection operation according to a result of the comparison.

Preferably, the step of determining an error may include comparing respective evaluation values calculated for at least some of the plurality of positions with a predetermined threshold value, and determining that there is an error in the detection operation when the number of positions satisfying a condition of a predetermined magnitude relationship reaches a predetermined number as a result of the comparison.

Preferably, the step of determining an error may include calculating, for at least some of the plurality of positions, a first evaluation value according to a difference between the detection data in one position of the detection surface and the detection data at a position adjacent to the one position in every one of cycles of the detection operation, and a second evaluation value according to a temporal change amount of the detection data in two successive cycles of the detection operation, and determining that there is an error in the detection operation when the first evaluation value and the second evaluation value that are calculated satisfy a predetermined error determination condition.

A third aspect of the present invention relates to a program for causing a computer to execute the method of controlling the input device according to the second aspect of the present invention.

According to the present invention, it is possible to reduce an influence of a detection error due to noise.

BRIEF DESCRIPTION OF THE DRAWINGS

FIGS. 2A and 2B are diagrams illustrating an example of detection data groups input from a sensor unit in every one of cycles of a detection operation. FIG. 2A illustrates a detection data group input in the latest cycle. FIG. 2B illustrates a detection data group input in a cycle immediately before the detection data group illustrated in FIG. 2A.

FIG. 3A illustrates a distribution of the temporal change amount of the detection data appearing due to an influence of noise, and FIG. 3B illustrates a distribution of the temporal change amount of the detection data appearing due to approach of an object.

DESCRIPTION OF THE PREFERRED EMBODIMENTS

First Embodiment

Figure 1:
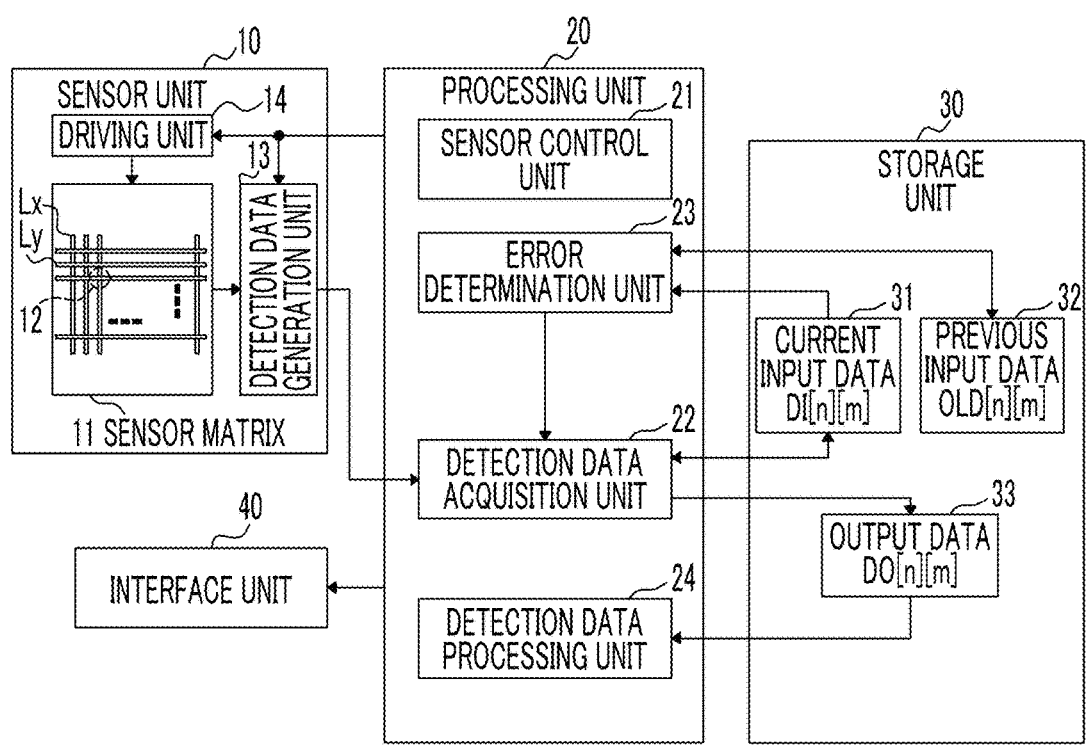
FIG. 1 is a diagram illustrating an example of a configuration of an input device according to an embodiment of the present invention.

FIG. 1 is a diagram illustrating an example of a configuration of an input device according to an embodiment of the present invention.

The input device illustrated in FIG. 1 includes a sensor unit 10, a processing unit 20, a storage unit 30, and an interface unit 40. The input device according to this embodiment is a device that inputs information according to an approach state by causing an object such as a finger or a pen to approach a detection surface on which a sensor is provided. The "approach" in this specification includes both of being close in a contact state and being close in a non-contact state.

Sensor Unit 10

The sensor unit 10 detects a degree of approach of an object such as a finger or a pen at each of a plurality of detection positions distributed in a detection surface. For example, the sensor unit 10 includes a sensor matrix 11 in which capacitive sensor elements (capacitors) 12 of which the capacitance changes according to the approach of an object are formed in a matrix form, a detection data generation unit 13 that generates detection data corresponding to the capacitance of a capacitive sensor element 12, and a driving unit 14 that applies a driving voltage to the capacitive sensor element 12.

The sensor matrix 11 includes a plurality of driving electrodes Lx extending in a vertical direction (Y direction), and a plurality of detection electrodes Ly extending in a horizontal direction (X direction). The plurality of driving electrodes Lx are arranged in parallel in the horizontal direction (X direction), and the plurality of detection electrodes Ly are arranged in parallel in the vertical direction (Y direction). The plurality of driving electrodes Lx and the plurality of detection electrodes Ly intersect in a lattice form, and are insulated from each other. The capacitive sensor element 12 is formed near an intersection portion of the driving electrode Lx and the detection electrode Ly. Further, in the example of FIG. 1, shapes of the electrodes Lx and Ly are drawn in a strip shape, but may be any other shape (for example, a diamond pattern).

The driving unit 14 applies a driving voltage to each capacitive sensor element 12 of the sensor matrix 11. Specifically, the driving unit 14 sequentially selects one driving electrode Lx from among the plurality of driving electrodes Lx under the control of the processing unit 20, and periodically changes a potential of the selected driving electrode Lx. A potential of the driving electrode Lx changes in a predetermined range, and thus, the driving voltage applied to the capacitive sensor element 12 formed near the intersection point of this driving electrode Lx and the detection electrode Ly changes in a predetermined range, and the capacitive sensor element 12 is charged or discharged.

The detection data generation unit 13 generates the detection data according to charge transferred in each detection electrode Ly when the capacitive sensor element 12 is charged or discharged due to the driving unit 14 applying the driving voltage. In other words, the detection data generation unit 13 samples the charge transferred in each detection electrode Ly at a timing synchronized with a periodic change in the driving voltage of the driving unit 14, and generates the detection data according to a result of the sampling.

For example, the detection data generation unit 13 includes a capacitance-to-voltage conversion circuit (CV conversion circuit) that outputs a voltage according to the capacitance of the capacitive sensor element 12, and an analog-to-digital conversion circuit (AD conversion circuit) that converts an output signal of the CV conversion circuit into a digital signal and outputs the digital signal as detection data.

The CV conversion circuit samples the charge transferred in the detection electrode Ly under control of the processing unit 20 each time the driving voltage of the driving unit 14 periodically changes and the capacitive sensor element 12 is charged or discharged. Specifically, each time a positive or negative charge is transferred in the detection electrode Ly, the CV conversion circuit transfers this charge or a charge proportional thereto to a capacitor for reference, and outputs a signal according to a voltage generated in the capacitor for reference. For example, the CV conversion circuit outputs a signal according to an integrated value or an average value of the charge periodically transferred in the detection electrode Ly or a charge proportional thereto. The AD conversion circuit converts the output signal of the CV conversion circuit into a digital signal in a predetermined period under control of the processing unit 20, and outputs the digital signal as detection data.

Further, while the sensor unit 10 shown in the above-described example detects approach of the object based on a change in the capacitance (mutual capacitance) generated between the electrodes Lx and Ly, the present invention is not limited thereto and the approach of the object may be detected using various other schemes. For example, the sensor unit 10 may adopt a scheme of detecting capacitance (self-capacitance) generated between the electrode and a ground due to the approach of the object. In the case of a scheme of detecting the self-capacitance, a driving voltage is applied to the detection electrode. Further, the sensor unit 10 is not limited to a capacitance scheme, and may utilize, for example, a resistance film scheme or be of an electromagnetic induction type.

Processing Unit 20

The processing unit 20 is a circuit that controls an overall operation of the input device and includes, for example, a computer that performs processing according to instruction codes of a program stored in the storage unit 30 or a logic circuit that realizes a specific function. All of the processing of the processing unit 20 may be realized by the computer and the program, or a part or all thereof may be realized by a dedicated logic circuit.

In the example of FIG. 1, the processing unit 20 includes a sensor control unit 21, a detection data acquisition unit 22, an error determination unit 23, and a detection data processing unit 24.

The sensor control unit 21 controls the sensor unit 10 so that the sensor unit 10 performs a periodic detection operation of generating detection data in a plurality of detection positions (capacitive sensor elements 12 of the sensor matrix 11) of a detection surface in every one of cycles. Specifically, the sensor control unit 21 controls circuits of the driving unit 14 and the detection data generation unit 13 so that selection of the driving electrode and generation of a pulse voltage in the driving unit 14, and selection of the detection electrode and generation of detection data in the detection data generation unit 13 are periodically performed at an appropriate timing.

The detection data acquisition unit 22 acquires a plurality of detection data items (detection data group) generated for the plurality of detection positions on the detection surface in every one of cycles of the detection operation of the sensor unit 10 from the sensor unit 10. However, the detection data acquisition unit 22 skips a process of acquiring the detection data generated in the one cycle when the error determination unit 23 to be described below determines that there is an error in the detection operation of one cycle.

For example, the detection data acquisition unit 22 receives the detection data group from the sensor unit 10 in every one of cycles of the detection operation, and stores the detection data group as input data DI in the storage unit 30. The detection data acquisition unit 22 stores the input data DI generated in the cycle in which the error determination unit 23 determines that there is no error, as the output data DO, in the storage unit 30. On the other hand, the detection data acquisition unit 22 does not store the input data DI generated in the cycle in which it is determined that there is an error, as the output data DO, in the storage unit 30. At the cycle in which the output data DO of the storage unit 30 is not updated due to error determination, for example, the detection data group (output data DO) having the same value as that at the previous cycle is regarded as being acquired, and processing in a block of a subsequent stage (for example, detection data processing unit 24) is performed.

The error determination unit 23 determines, in every one of the cycles, whether or not there is an error in the detection operation due to noise based on a degree of a temporal change and a degree of a positional change in the detection data generated in the sensor unit 10.

For example, the error determination unit 23 calculates an evaluation value E according to a degree to which the degree of a temporal change in the detection data further changes according to a position in every one of cycles of the detection operation in the sensor unit 10, and determines that there is an error in the detection operation of the sensor unit 10 when the calculated evaluation value E satisfies a predetermined error determination condition.

Specifically, the error determination unit 23 calculates the evaluation value E according to a difference between temporal change amounts of the detection data generated in a plurality of successive cycles.

Here, the "temporal change amount" is an amount of a change in the detection data in the same detection position generated in a plurality of successive cycles. For example, a difference between the detection data in two successive cycles or a value related to a magnitude of a change in the detection data in three or more successive cycles (for example, a difference between a maximum value and a minimum value, a dispersion, or a standard deviation) may be the "temporal change amount".

Further, a "difference between the temporal change amounts of the detection data" is a difference between the temporal change amount at one detection position of the detection surface and the temporal change amount at a detection position adjacent to the one detection position. The "adjacent detection position" may include only one detection position or may include a plurality of detection positions. When the "adjacent detection position" includes a plurality of detection positions, for example, a difference between the temporal change amount at one detection position and an average value of the temporal change amounts at a plurality of detection positions adjacent to the one detection position may be the "difference between the temporal change amounts of the detection data".

The error determination unit 23 calculates the evaluation value E according to the "difference between the temporal change amounts of the detection data" for at least some of the plurality of detection positions on the detection surface, and obtains a sum S of the evaluation values E. The error determination unit 23 compares the sum S of the calculated evaluation values E with a predetermined threshold value TH1, and determines whether or not there is an error in the detection operation according to a result of the comparison.

For example, the error determination unit 23 calculates the evaluation value E using the detection data groups (input data DI and input data OLD) input from the sensor unit 10 via the detection data acquisition unit 22 in every one of cycles.

FIGS. 2A and 2B are diagrams illustrating an example of a detection data group (input data DI) input from the sensor unit 10 in every one of cycles of the detection operation. FIG. 2A illustrates a detection data group (input data DI) input in the latest cycle, and FIG. 2B illustrates a detection data group (input data OLD) input in a cycle immediately before the cycle of the input data DI.

The detection data groups (the input data DI and OLD) shown in the example of FIGS. 2A and 2B form two-dimensional data in a matrix form. "DI [n] [m]" indicates a matrix element in an m-th row and an n-th column in the input data DI, and "OLD [n] [m]" indicates a matrix element in an m-th row and an n-th column in the input data OLD.

Each matrix element of the two-dimensional data indicates the detection data generated for each of M×N detection positions arranged in matrix form in the detection surface. When a row direction in a matrix-like arrangement of the detection positions is an X direction and a column direction is a Y direction, a row number and a column number of the two-dimensional data indicate an X coordinate and a Y coordinate of the detection position. That is, the element in the m-th row and the n-th column in the two-dimensional data indicates detection data generated for a detection position (hereinafter referred to as "detection position P(n, m)") of which the X coordinate is "n" and the Y coordinate is "m" in the detection surface.

An evaluation value E(n, m) at the detection position P(n, m) is expressed by, for example, the following equation.

[Equation 1]

$$E(n, m) = \left\{ \frac{dDI}{dt}(n+1, m) - \frac{dDI}{dt}(n, m) \right\}^2 \quad (1)$$

"dDI(n, m)/dt" in Equation (1) indicates a temporal change amount of the detection data generated for the detection position P(n, m). Further, "dDI(n+1, m)/dt" indicates a temporal change amount of the detection data generated for a detection position P(n+1, m). The temporal change amounts are expressed by, for example, equations below.

[Equation 2]

$$\frac{dDI}{dt}(n+1, m) = DI[n+1][m] - OLD[n+1][m] \quad (2\text{-}1)$$

$$\frac{dDI}{dt}(n, m) = DI[n][m] - OLD[n][m] \quad (2\text{-}2)$$

The error determination unit 23 calculates a sum S of the evaluation values E(n, m) in the entire detection surface using, for example, the following equation.

[Equation 3]

$$S = \sum_{m=0}^{M-1} \sum_{n=0}^{N-2} E(n, m) \quad (3)$$

The error determination unit 23 determines that there is an error in the detection operation due to noise when the sum S is greater than the predetermined threshold value TH1.

The detection data processing unit 24 performs a process of calculating coordinates of a position that the object approaches, a process of determining a type of the object, or the like, based on the output data DO obtained in every one of cycles in the detection data acquisition unit 22.

For example, the detection data processing unit 24 calculates a difference between the output data DO in a matrix form acquired by the detection data acquisition unit 22 and a base value in a matrix form stored in another storage area (a base value memory) of the storage unit 30 in advance, and stores a result of the calculation as two-dimensional data in a matrix form in the storage unit 30. A value (base value) serving as a reference for the detection data in a state in which the object does not approach the detection surface is stored in the base value memory.

The detection data processing unit 24 specifies an object approach region on the detection surface based on the two-dimensional data indicating the amount of change from the base value, and calculates coordinates of the object from, for example, a shape of the specified approach region or a distribution of the data value in the approach region. Further, the detection data processing unit 24 determines whether the object comes in contact or a type (finger/palm) of the object based on an area of the approach region in the detection surface of the object of which the coordinates have been calculated, magnitudes of the data values in the approach region, or the like.

Storage Unit 30

The storage unit 30 stores constant data or variable data that is used for processing in the processing unit 20. When the processing unit 20 includes a computer, the storage unit 30 may store a program executed in the computer. The storage unit 30 includes a volatile memory such as a DRAM or an SRAM, a nonvolatile memory such as a flash memory, a hard disk, or the like.

Interface Unit 40

The interface unit 40 is a circuit for exchanging data between the input device and another control device (for example, a control IC of an information device having the input device mounted thereon). The processing unit 20 outputs information (for example, coordinate information of the object or the number of objects) stored in the storage unit 30 from the interface unit 40 to a control device (not shown). Further, the interface unit 40 may acquire a program to be executed in a computer of the processing unit 20 from a disk drive device (not shown) (a device that reads a program recorded in a non-transitory storage medium), a server, or the like, and load the program onto the storage unit 30.

Next, an error determination of a detection operation and acquisition of detection data according to this in the input device having the above configuration will be described.

Figure 3A:
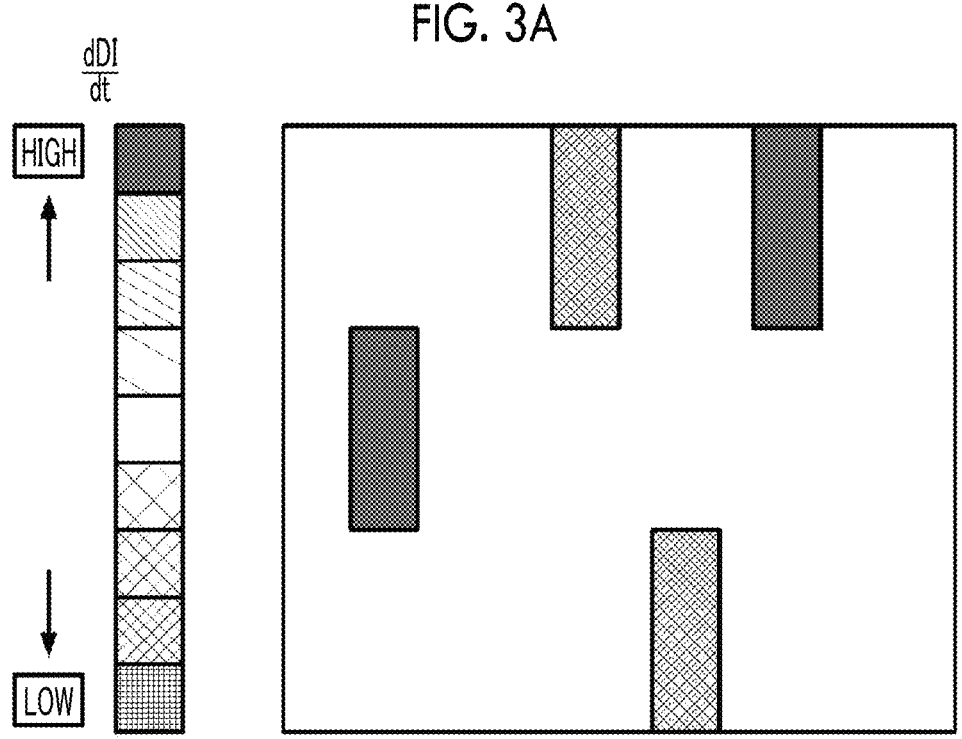
FIGS. 3A and 3B are diagrams illustrating that a positional distribution of a temporal change amount of detection data is different between a case in which the positional distribution is due to noise and a case in which the positional distribution is due to approach of an object.
Figure 3B:
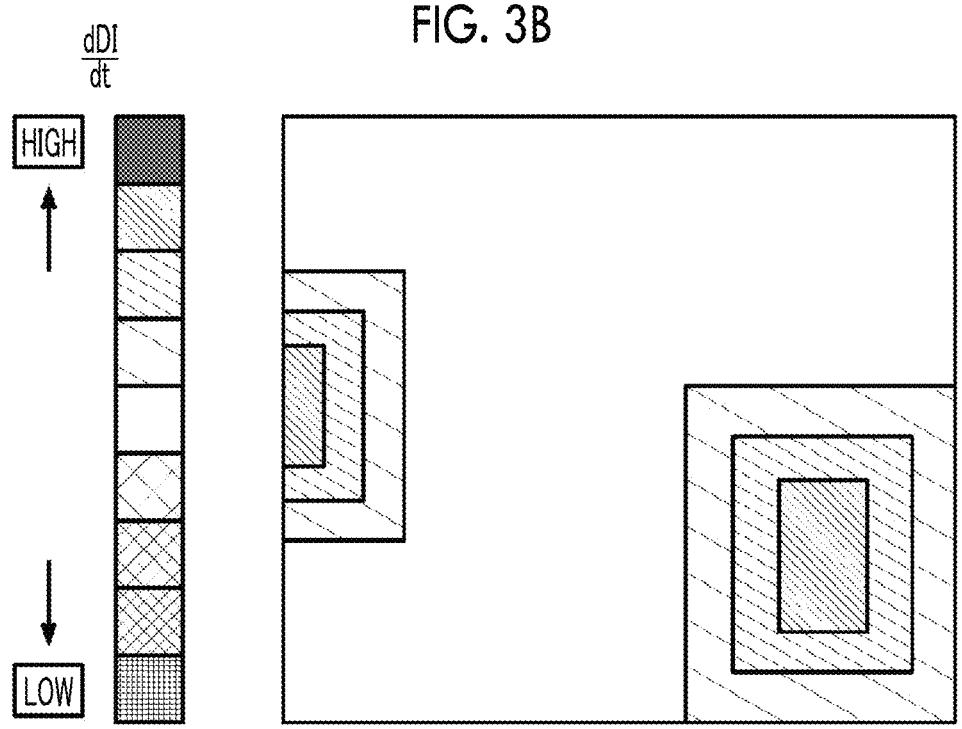

FIGS. 3A and 3B are diagrams illustrating that a positional distribution of a temporal change amount of the detection data is different between a case in which the positional distribution is due to noise and a case in which the positional distribution is due to approach of an object. FIG. 3A illustrates a distribution of the temporal change amount of the detection data appearing due to an influence of noise, and FIG. 3B illustrates a distribution of the temporal change amount of the detection data appearing due to approach of an object (for example, a finger).

When the detection data is changed due to the approach of the object such as a finger, the temporal change amount of the detection data is relatively small as illustrated in FIG. 3B, and a positional change of the temporal change amount appears relatively gradually. On the other hand, when the detection data is changed due to an influence of noise, the temporal change amount of the detection data is large as illustrated in FIG. 3A, and the positional change of the temporal change amount appears suddenly.

Therefore, when the detection data is changed due to an influence of noise, the temporal change amounts as shown in Equations (2-1) and (2-2) increase and the evaluation value E(n, m) of Equation (1) obtained by squaring the difference between the temporal change amounts increases. Accordingly, the sum S of Equation (3) in which the evaluation values E(n, m) are summed becomes a large value. Therefore, when the sum S exceeds the predetermined threshold value TH1, it can be determined that there is an error in the detection operation due to noise.

Figure 4:
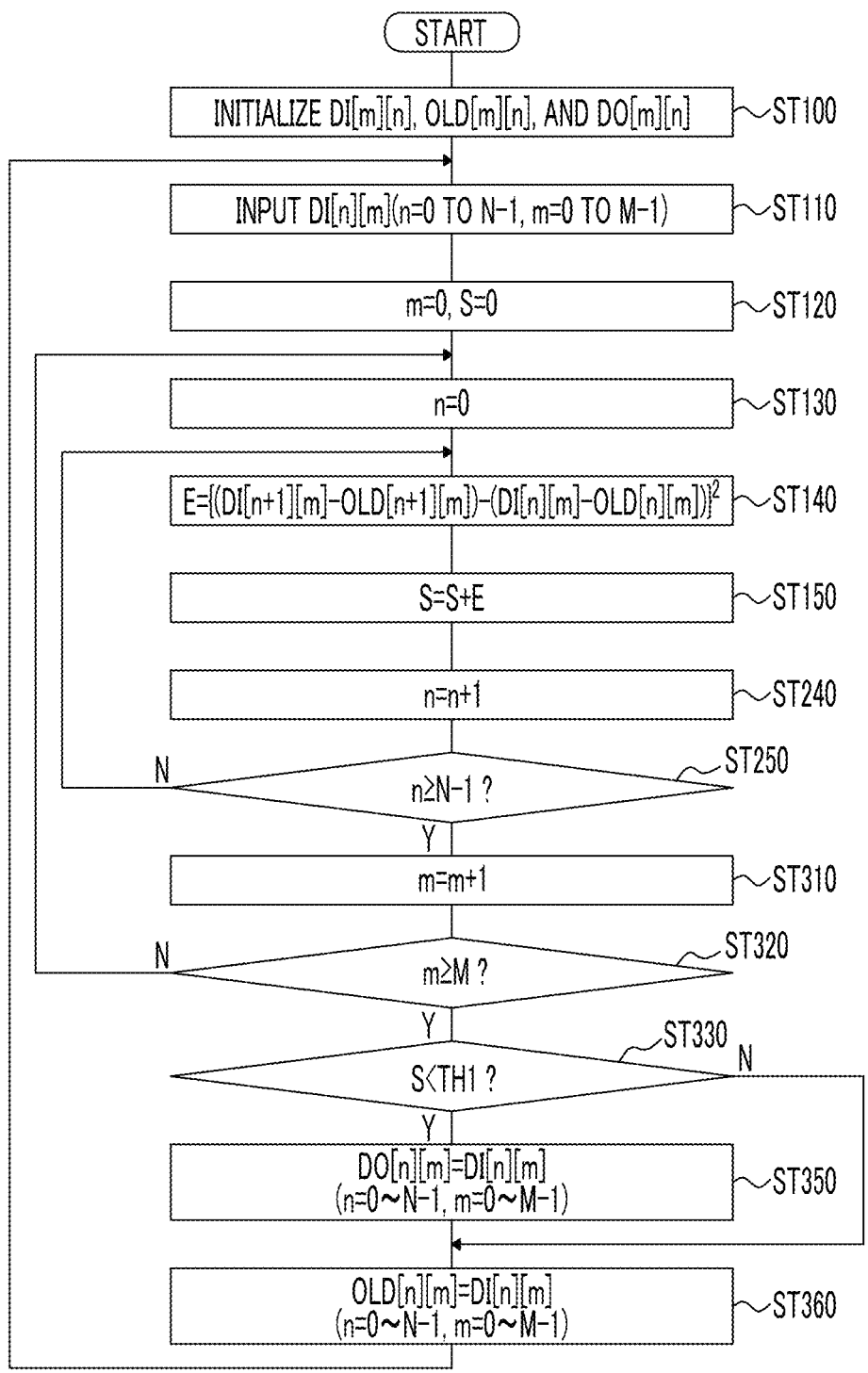
FIG. 4 is a flowchart illustrating a process related to an error determination of a detection operation and acquisition of detection data in the input device according to a first embodiment.

FIG. 4 is a flowchart illustrating a process related to an error determination of a detection operation and acquisition of detection data in the input device according to the first embodiment.

ST100: When starting the operation, the processing unit 20 initializes the input data DI and OLD and the output data DO stored in the storage unit 30.

ST110: The detection data acquisition unit 22 receives the detection data group corresponding to one cycle (N×M detection data corresponding to N×M detection positions in the detection surface) from the sensor unit 10, and stores this detection data group as the input data DI in the storage unit 30.

ST120: The error determination unit 23 initializes "m" indicating a Y coordinate of the detection position and "S" indicating a sum of the evaluation values E to zero.

ST130: The error determination unit 23 initializes "n" indicating an X-coordinate of the detection position to zero.

ST140: The error determination unit 23 calculates the evaluation value E(n, m) at the detection position P(n, m) by referring to latest input data DI and previous input data OLD stored in the storage unit 30. The calculation of the evaluation value E based on the input data DI and the previous input data OLD is not limited to the calculation of the square as shown in Equation (1). For example, an absolute value may be calculated unlike the calculation of the square in Equation (1), or one-half power (square root) or the fourth power may be calculated.

ST150: The error determination unit 23 adds the evaluation value E(n, m) calculated in step ST140 to the sum S.

ST240 and ST250: The error determination unit 23 adds "1" to "n" indicating the X-coordinate of the detection position and determines whether "n" is equal to or greater than "N−1". When "n" is smaller than "N−1", the error determination unit 23 returns to step ST140 to repeat the calculation of the evaluation value E(n, m) and the updating of the sum S described above. When "n" is equal to or greater than "N−1", the error determination unit 23 proceeds to step ST310.

ST310 and ST320: The error determination unit 23 adds "1" to "m" indicating the Y coordinate of the detection position, and determines whether "m" is equal to or greater than "M". When "m" is smaller than "M", the error determination unit 23 returns to step ST130 to repeat the process of steps ST130 to ST250. When "m" is equal to or greater than "M", the error determination unit 23 proceeds to next step ST330.

ST330: The error determination unit 23 compares the sum S that is a result of summing all the evaluation values E of the detection surface with a threshold value TH1. When the sum S is smaller than the threshold value TH1, the error determination unit 23 determines that there is no error in the detection operation of the sensor unit 10. When the sum S is equal to or greater than the threshold value TH1, the error determination unit 23 determines that there is an error in the detection operation.

ST350: When the error determination unit 23 determines that there is no error, the detection data acquisition unit 22 sets the input data DI input from the sensor unit 10 in the latest cycle as the output data DO, and stores the output data DO in the storage unit 30 (detection data acquisition process). On the other hand, when the error determination unit 23 determines that there is an error, the detection data acquisition unit 22 skips this detection data acquisition process. In a cycle in which the detection data acquisition process is skipped, the output data DO stored in the storage unit 30 is not updated.

ST360: The error determination unit 23 applies the input data DI stored in the storage unit 30 to the input data OLD, and returns to step ST110. Accordingly, the input data DI of the latest cycle is stored in the storage unit 30 as the input data OLD of the previous cycle, and then the input data DI is updated to the latest value.

As described above, according to the input device of this embodiment, it is possible to accurately determine whether or not there is an error in the detection operation due to noise based on a degree of the temporal change and a degree of the positional change in the detection data. Further, since the process of acquiring the detection data generated in a cycle in which it is determined that there is an error in the detection operation due to noise is skipped, it is possible to prevent calculation of the coordinates or the like from being performed based on wrong detection data, and to effectively reduce an influence of the detection error due to noise.

Further, according to the input device of this embodiment, since it is determined whether or not there is an error in the detection operation based on the sum S obtained by summing the evaluation values E in the respective detection positions on the detection surface, it is easy to recognize a change in the detection data locally occurring due to an influence of noise, and it is possible to determine whether or not there is an error more accurately.

Second Embodiment

Next, a second embodiment of the present invention will be described.

An input device according to the second embodiment is obtained by changing the determination operation of the error determination unit 23 in the input device according to the first embodiment. Other configurations are the same as those of the input device according to the first embodiment.

The error determination unit 23 in the second embodiment calculates an evaluation value EA according to a degree to which a degree of the positional change in the detection data temporally changes in every one of cycles of the detection operation of the sensor unit 10. When the evaluation value EA satisfies a predetermined error determination condition, the error determination unit 23 determines that there is an error in the detection operation of the sensor unit 10.

Specifically, the error determination unit 23 calculates the evaluation value EA according to an amount by which the positional change amount of the detection data has temporally changed in a plurality of successive cycles of the detection operation.

Here, the "positional change amount" is a difference between the detection data in one position of the detection surface and the detection data at a position adjacent to the one position. The "adjacent detection position" may include only one detection position or may include a plurality of detection positions. When the "adjacent detection position" includes a plurality of detection positions, for example, a difference between detection data at one detection position and an average value of detection data at a plurality of detection positions adjacent to the one detection position may be the "positional change amount".

Further, the "amount by which the positional change amount has temporally changed" is an amount by which the positional change amount for the same detection position has changed in a plurality of successive cycles. For example, a difference between the positional change amounts in two successive cycles or a value related to a magnitude of a change in the positional change amount in three or more successive cycles (for example, a difference between a maximum value and a minimum value, a dispersion, or a standard deviation) may be the "amount by which the positional change amount of the detection data has temporally changed".

The error determination unit 23 calculates an evaluation value EA according to the "amount by which the positional change amount has temporally changed" for at least some of a plurality of detection positions on the detection surface, and obtains a sum SA of the evaluation values EA. The error determination unit 23 compares the sum SA of the calculated evaluation values EA with a predetermined threshold value TH1, and determines whether or not there is an error in the detection operation according to a result of the comparison.

An evaluation value EA(n, m) in a detection position P(n, m) is expressed by, for example, the following equation.

[Equation 4]

$$EA(n, m) = \left\{ \frac{dDI}{dx}(n, m) - \frac{dOLD}{dx}(n, m) \right\}^2 \quad (4)$$

"dDI(n, m)/dx" in Equation (4) indicates a positional change amount of the detection data of the input data DI calculated for the detection position P(n, m). Further, "dOLD (n, m)/dx" indicates a positional change amount of the detection data of the input data OLD calculated for the detection position P(n, m). The positional change amount is expressed by, for example, the following equation.

[Equation 5]

$$\frac{dDI}{dt}(n, m) = DI[n+1][m] - DI[n][m] \quad (5)$$

$$\frac{dOLD}{dt}(n, m) = OLD[n+1][m] - OLD[n][m] \quad (5)$$

The error determination unit 23 calculates the sum SA of the evaluation values EA(n, m) in the entire detection surface using, for example, the following equation.

[Equation 6]

$$SA = \sum_{m=0}^{M-1} \sum_{n=0}^{N-2} EA(n, m) \quad (6)$$

When this sum SA is greater than a predetermined threshold value TH1, the error determination unit 23 determines that there is an error in the detection operation due to noise.

Figure 5:
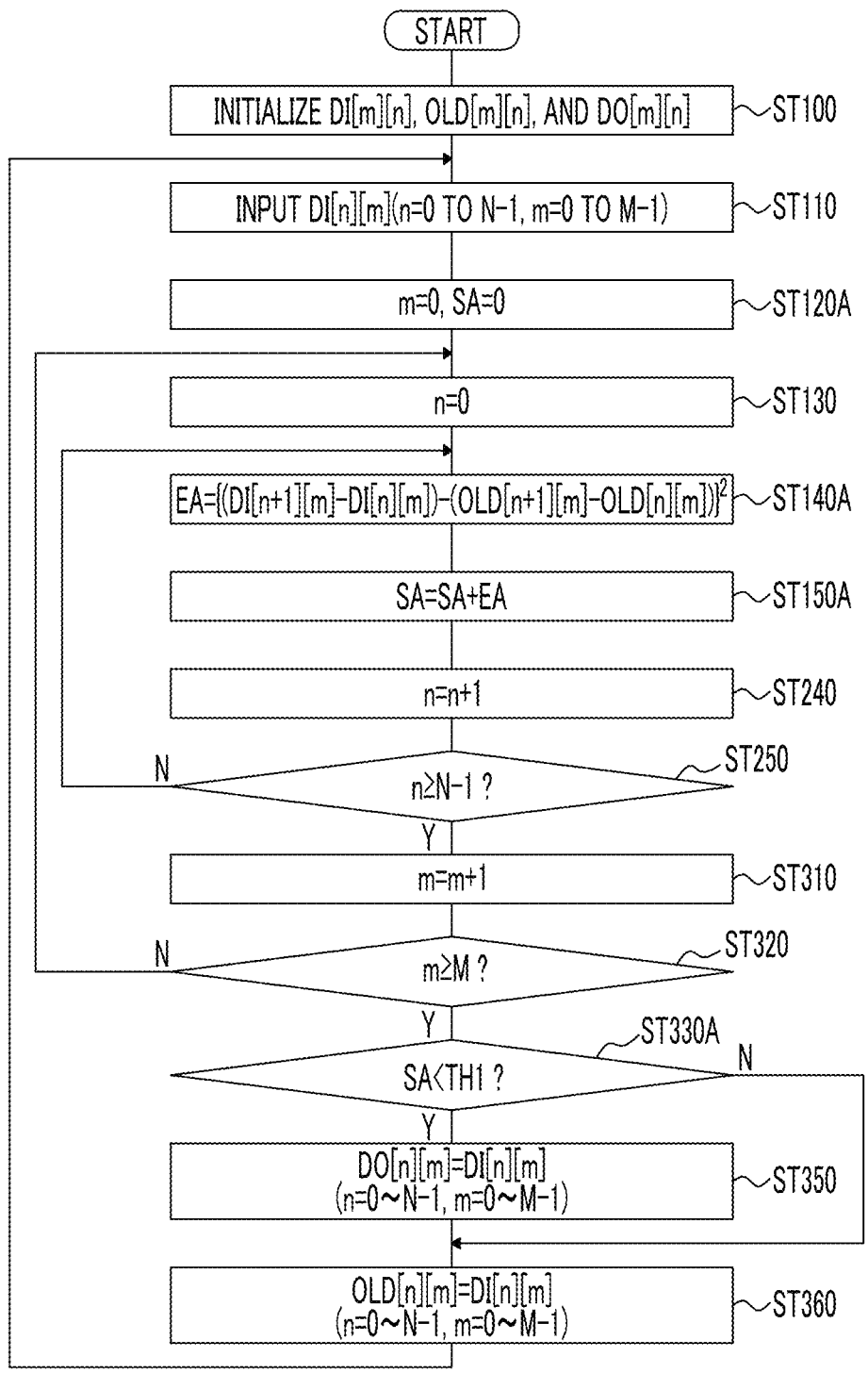
FIG. 5 is a flowchart illustrating a process related to an error determination of a detection operation and acquisition of detection data in an input device according to a second embodiment.

FIG. 5 is a flowchart illustrating a process related to an error determination of a detection operation and acquisition of detection data in the input device according to a second embodiment. The flowchart illustrated in FIG. 5 is obtained by changing step ST120 in the flowchart illustrated in FIG. 4 to step ST120A, steps ST140 and ST150 to steps ST140A and ST150A, and step ST330 to step ST330A. Other steps are the same as those in the flowchart illustrated in FIG. 4. Here, only the changed steps will be described.

ST120A: The error determination unit 23 initializes "m" indicating a Y coordinate of the detection position and "SA" indicating a sum of the evaluation values EA to zero.

ST140A: The error determination unit 23 calculates an evaluation value EA(n, m) in a detection position P(n, m) by referring to latest input data DI and previous input data OLD stored in the storage unit 30.

ST150A: The error determination unit 23 adds the evaluation values EA(n, m) calculated in step ST140A to the sum SA.

ST330A: The error determination unit 23 compares the sum SA that is a result of summing all evaluation values EA of the detection surface with a threshold value TH1. When the sum SA is smaller than the threshold value TH1, the error determination unit 23 determines that there is no error in the detection operation of the sensor unit 10. When the sum SA is greater than the threshold value TH1, the error determination unit 23 determines that there is an error in the detection operation.

In the input device according to the second embodiment described above, it is possible to achieve the same effect as that of the input device according to the first embodiment. That is, it is possible to accurately determine whether or not there is an error in the detection operation due to noise based on a degree of the temporal change in the detection data and a degree of the positional change in the detection data. Further, since the process of acquiring the detection data generated in a cycle in which it is determined that there is an error in the detection operation due to noise is skipped, it is possible to effectively reduce an influence of the detection error due to noise.

Third Embodiment

Next, a third embodiment of the present invention will be described.

The input device according to the third embodiment is obtained by changing the determination operation of the error determination unit 23 in the input device according to the first embodiment. Other configurations are the same as those of the input device according to the first embodiment.

The error determination unit 23 in the third embodiment calculates the evaluation value E (for example, Equation (1)) indicating the degree of the temporal change and the degree of the positional change in the detection data for at least some of the plurality of detection positions in the detection surface, and compares each calculated evaluation value E with a predetermined threshold value TH2. The error determination unit 23 counts the number "K" of detection positions in which a result of the comparison satisfies a condition of a predetermined magnitude relationship (for example, "E≥TH2"), and determines that there is an error in the detection operation when the count value K reaches a predetermined threshold value TH3.

Figure 6:
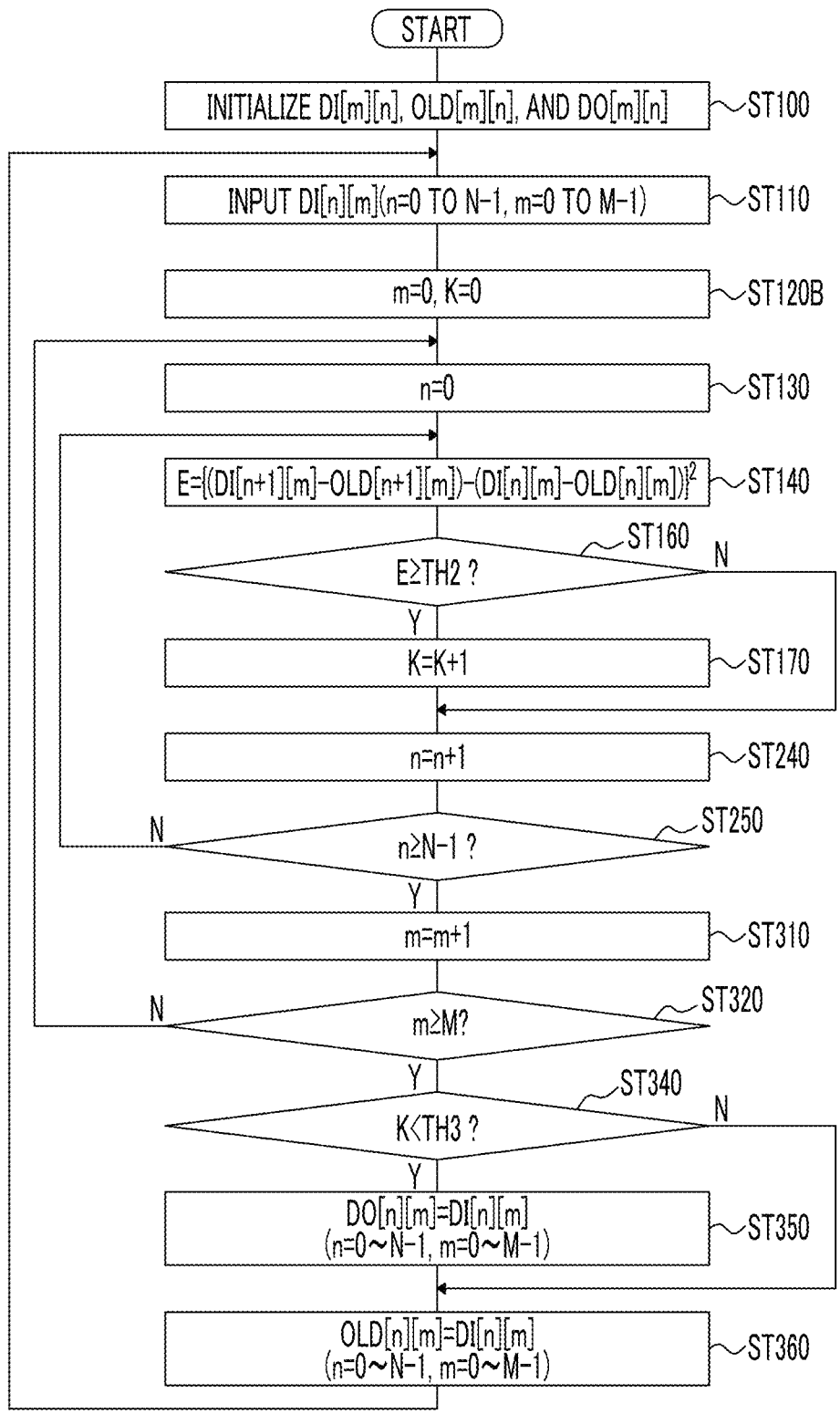
FIG. 6 is a flowchart illustrating a process related to an error determination of a detection operation and acquisition of detection data in an input device according to a third embodiment.

FIG. 6 is a flowchart illustrating a process related to an error determination of a detection operation and acquisition of detection data of the input device according to the third embodiment. The flowchart illustrated in FIG. 6 is obtained by changing step ST120 in the flowchart illustrated in FIG. 4 to step ST120B, replacing step ST150 with steps ST160 and ST170, and replacing step ST330 with step ST340. The other steps are the same as those of the flowchart illustrated in FIG. 4. Here, only the changed or replaced steps will be described.

ST120B: The error determination unit 23 initializes "m" indicating the Y coordinate of the detection position and the count value K to zero.

ST160 and ST170: The error determination unit 23 compares an evaluation value E calculated in step ST140 with a threshold value TH2, and adds "1" to the count value K when the evaluation value E is greater than the threshold value TH2. When the evaluation value E is smaller than the threshold value TH2, the error determination unit 23 maintains the count value K.

ST340: The error determination unit 23 compares the count value K that is the number of the detection positions in which the evaluation value E is greater than the threshold value TH2, with a predetermined threshold value TH3. When the count value K is smaller than the threshold value TH3, the error determination unit 23 determines that there is no error in the detection operation of the sensor unit 10. When the count value K is greater than the threshold value TH3, the error determination unit 23 determines that there is an error in the detection operation.

While the error determination unit 23 compares the evaluation value E in Equation (1) with the threshold value TH2 in the example of the flowchart described above, the error determination unit 23 may compare the evaluation value EA of Equation (4) rather than the evaluation value E with the threshold value TH2.

In the input device according to the third embodiment described above, it is also possible to achieve the same effect as that of the input device according to the first embodiment. That is, it is possible to accurately determine whether or not there is an error in the detection operation due to noise based on a degree of the temporal change in the detection data and a degree of the positional change in the detection data. Further, since the process of acquiring the detection data generated in a cycle in which it is determined that there is an error in the detection operation due to noise is skipped, it is possible to effectively reduce an influence of the detection error due to noise.

Further, in the input device according to this embodiment, even when the evaluation value E or the evaluation value EA becomes locally extremely large value due to noise, if a region thereof is very small, it is possible to prevent the error from being determined as an error in the detection operation of the entire detection surface. An error in the detection data generated in a very small region is likely to be removed through a subsequent filter process. Accordingly, in this case, by preventing the error from being determined as an error in the detection operation of the entire detection surface, it is possible to suppress deterioration of object detection performance due to temporary stopping of the detection data acquisition process.

Fourth Embodiment

Next, a fourth embodiment of the present invention will be described.

An input device according to the fourth embodiment is different from the input device according to the first embodiment in the determination operation of the error determination unit 23. Other configurations are the same as those of the input device according to the first embodiment.

The error determination unit 23 in the fourth embodiment calculates a first evaluation value E1 according to a positional change amount of the detection data and a second evaluation value E2 according to a temporal change amount of the detection data for at least some of a plurality of detection positions in the detection surface, and determines that there is an error in the detection operation of the sensor unit 10 when the first evaluation value E1 and the second evaluation value E2 that have been calculated satisfy a predetermined error determination condition.

Here, the "positional change amount" is a difference between the detection data in one position of the detection surface and the detection data at a position adjacent to the one position. The "adjacent detection position" may include only one detection position or may include a plurality of detection positions. When the "adjacent detection position" includes a plurality of detection positions, for example, a difference between detection data at one detection position and an average value of detection data at a plurality of detection positions adjacent to the one detection position may be the "positional change amount".

Further, the "temporal change amount" is an amount of a change in the detection data in the same detection position generated in a plurality of successive cycles. For example, a difference between the detection data in two successive cycles or a value related to a magnitude of a change in the detection data in three or more successive cycles (for example, a difference between a maximum value and a minimum value, a dispersion, or a standard deviation) may be the "temporal change amount".

The first evaluation value E1 according to the "positional change amount" at the detection position P(n, m) is expressed by, for example, the following equation.

[Equation 7]

$$E1(n, m) = \left\{\frac{dDI}{dx}(n, m)\right\}^2 = \{DI[n+1][m] - DI[n][m]\}^2 \quad (7)$$

Further, the second evaluation value E2 according to the "temporal change amount" at the detection position P(n, m) is expressed by, for example, the following equation.

[Equation 8]

$$E2(n, m) = \left\{\frac{dDI}{dx}(n, m)\right\}^2 = \{DI[n][m] - OLD[n][m]\}^2 \quad (8)$$

The error determination unit 23 calculates a sum S1 of the first evaluation values E1(n, m) and a sum S2 of the second evaluation values E2(n, m) in the entire detection surface using, for example, the following equation.

[Equation 9]

$$S1 = \sum_{m=0}^{M-1} \sum_{n=0}^{N-2} E1(n, m) \quad (9\text{-}1)$$

$$S2 = \sum_{m=0}^{M-1} \sum_{n=0}^{N-2} E2(n, m) \quad (9\text{-}2)$$

When this sum S1 is greater than a predetermined threshold value TH4 and the sum S2 is greater than a predetermined threshold value TH5, the error determination unit 23 determines that there is an error in the detection operation due to noise.

Figure 7:
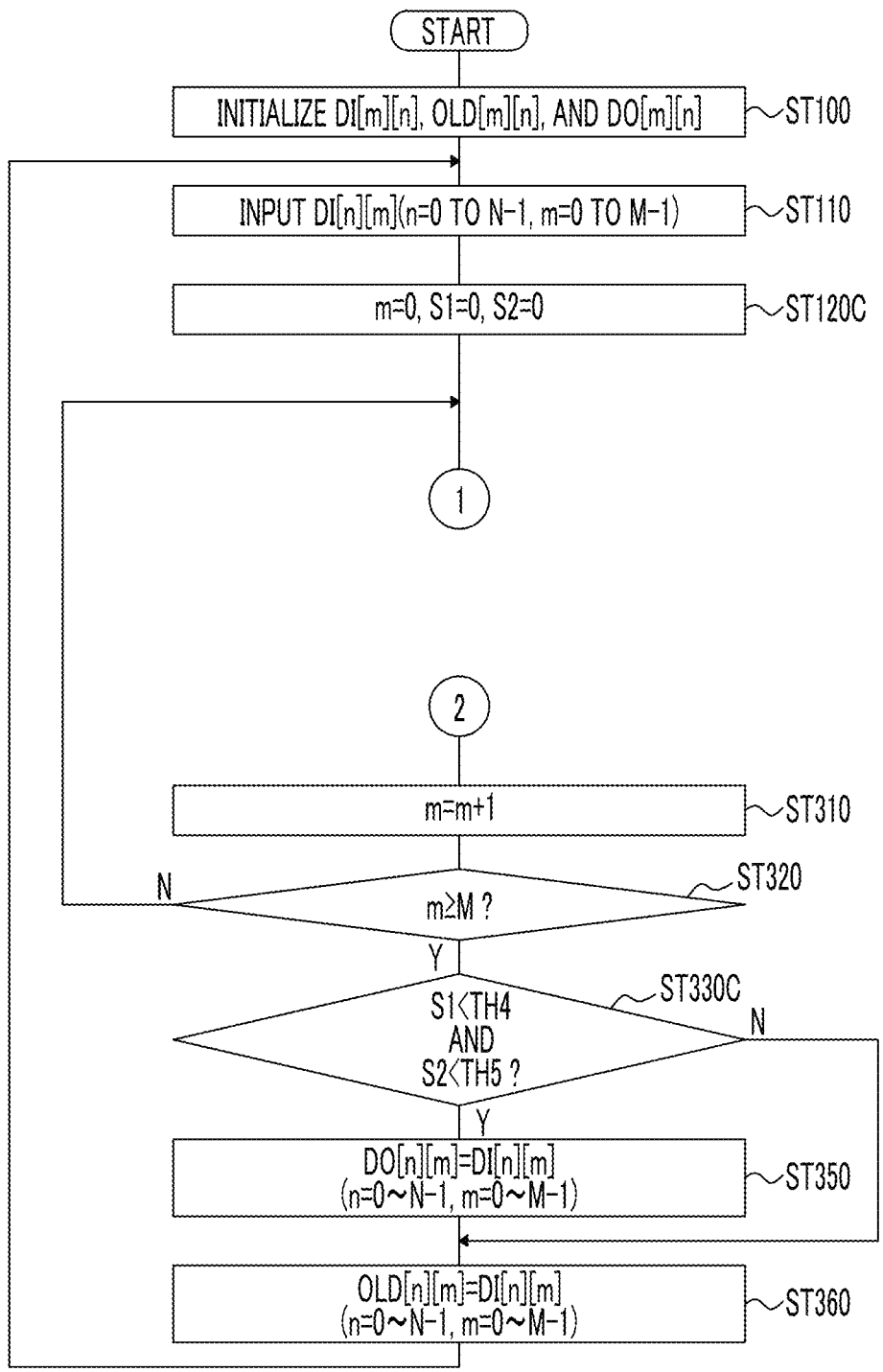
FIG. 7 is a first flowchart illustrating a process related to an error determination of a detection operation and acquisition of detection data in an input device according to a fourth embodiment.
Figure 8:
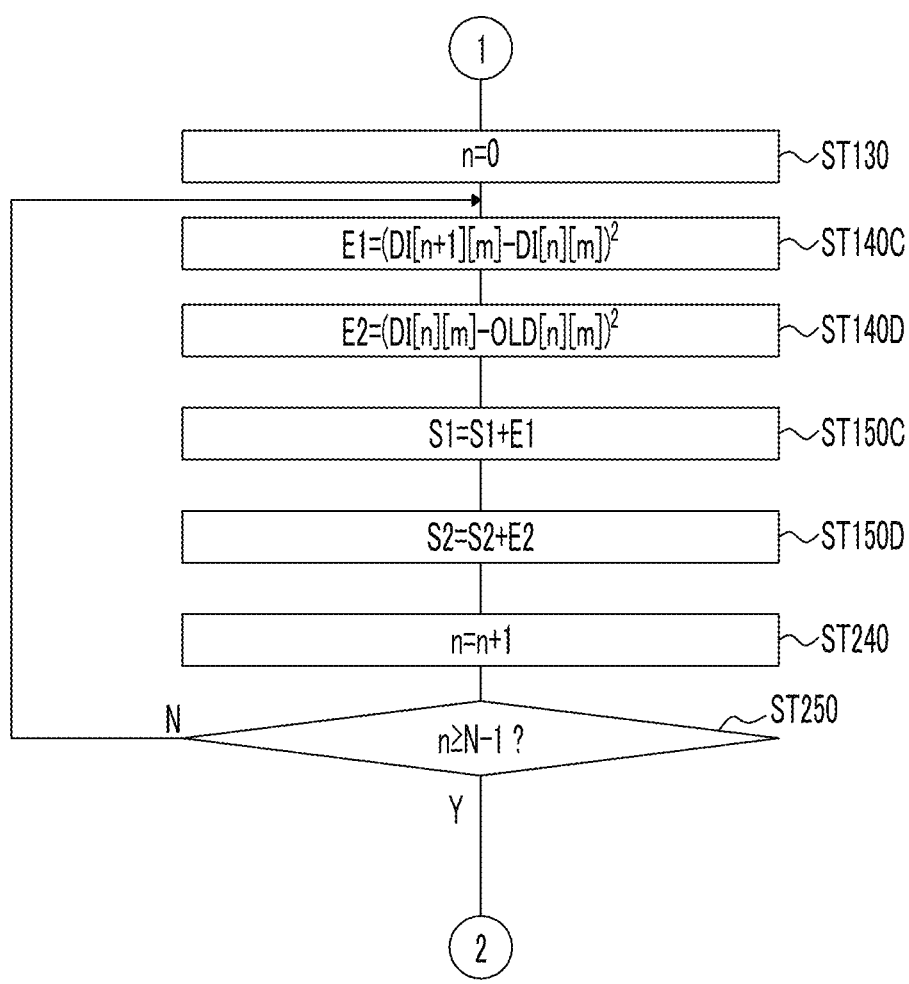
FIG. 8 is a second flowchart illustrating a process related to an error determination of a detection operation and acquisition of detection data in the input device according to the fourth embodiment.

FIGS. 7 and 8 are flowcharts illustrating a process related to an error determination of the detection operation and acquisition of the detection data in the input device according to the fourth embodiment. The flowcharts illustrated in FIGS. 7 and 8 are obtained by changing step ST120 in the flowchart illustrated in FIG. 4 to step ST120C, replacing step ST140 with steps ST140C and ST140D, replacing step ST150 with steps ST150C and ST150D, and changing step ST330 to step ST330C. Other steps are the same as those of the flowchart illustrated in FIG. 4. Here, only the changed or replaced steps will be described.

ST120C: The error determination unit 23 initializes "m" indicating a Y coordinate of the detection position, "S1" indicating a sum of the first evaluation values E1, and "S2" indicating the sum of the second evaluation values E2 to zero.

ST140C and ST140D: The error determination unit 23 calculates the first evaluation value E1 (n, m) and the second evaluation value E2(n, m) at the detection position P(n, m) by referring to the latest input data DI and the previous input data OLD stored in the storage unit 30.

ST150C and ST150D: The error determination unit 23 adds the first evaluation value E1(n, m) calculated in step ST140C to the sum S1, and adds the second evaluation value E2(n, m) calculated in step ST140D to the sum S2.

ST330C: The error determination unit 23 compares the sum S1 that is a result of summing the first evaluation values E1 of the entire detection surface with the threshold value TH4, and compares the sum S2 that is a result of summing the second evaluation values E2 of the entire detection surface with the threshold value TH5. When the sum S1 is smaller than the threshold value TH4 and the sum S2 is smaller than the threshold value TH5, the error determination unit 23 determines that there is no error in the detection operation of the sensor unit 10. On the other hand, when the sum S1 is greater than the threshold value TH4 or the sum S2 is greater than the threshold value TH5, the error determination unit 23 determines that there is an error in the detection operation.

In another modification example, the error determination unit 23 may determine that there is no error in the detection operation of the sensor unit 10 when the sum S1 is smaller than the threshold value TH4 or the sum S2 is smaller than the threshold value TH5, and determine that there is an error in the detection operation of the sensor unit 10 when the sum S1 is greater than the threshold value TH4 and the sum S2 is greater than the threshold value TH5.

In the input device according to the fourth embodiment described above, it is also possible to achieve the same effect as that of the input device according to the first embodiment. That is, it is possible to accurately determine whether or not there is an error in the detection operation due to noise based on a degree of the temporal change in the detection data and a degree of the positional change in the detection data. Further, since the process of acquiring the detection data generated in a cycle in which it is determined that there is an error in the detection operation due to noise is skipped, it is possible to effectively reduce an influence of the detection error due to noise.

Fifth Embodiment

Next, a fifth embodiment of the present invention will be described.

An input device according to the fifth embodiment is different from the input device according to the first embodiment in the determination operation of the error determination unit 23. Other configurations are the same as those of the input device according to the first embodiment.

The error determination unit 23 in the fifth embodiment calculates a first evaluation value E1 (for example, Equation (7)) according to a positional change amount of detection data, and a second evaluation value E2 (for example, Equation (8)) according to a temporal change amount of the detection data for at least some of a plurality of detection positions in a detection surface.

The error determination unit 23 compares each calculated, first evaluation value E1 with a predetermined threshold value TH6 and counts the number "K1" of detection positions satisfying a predetermined magnitude relationship (for example, "E1≥TH6") as a result of the comparison. Further, the error determination unit 23 compares each calculated, second evaluation value E2 with a predetermined threshold value TH7 and counts the number "K2" of detection positions satisfying a predetermined magnitude relationship (for example, "E2≥TH7") as a result of the comparison.

The error determination unit 23 determines that there is an error in the detection operation when the count value K1 reaches a predetermined threshold value TH8 and the count value K2 reaches a predetermined threshold value TH9.

Figure 9:
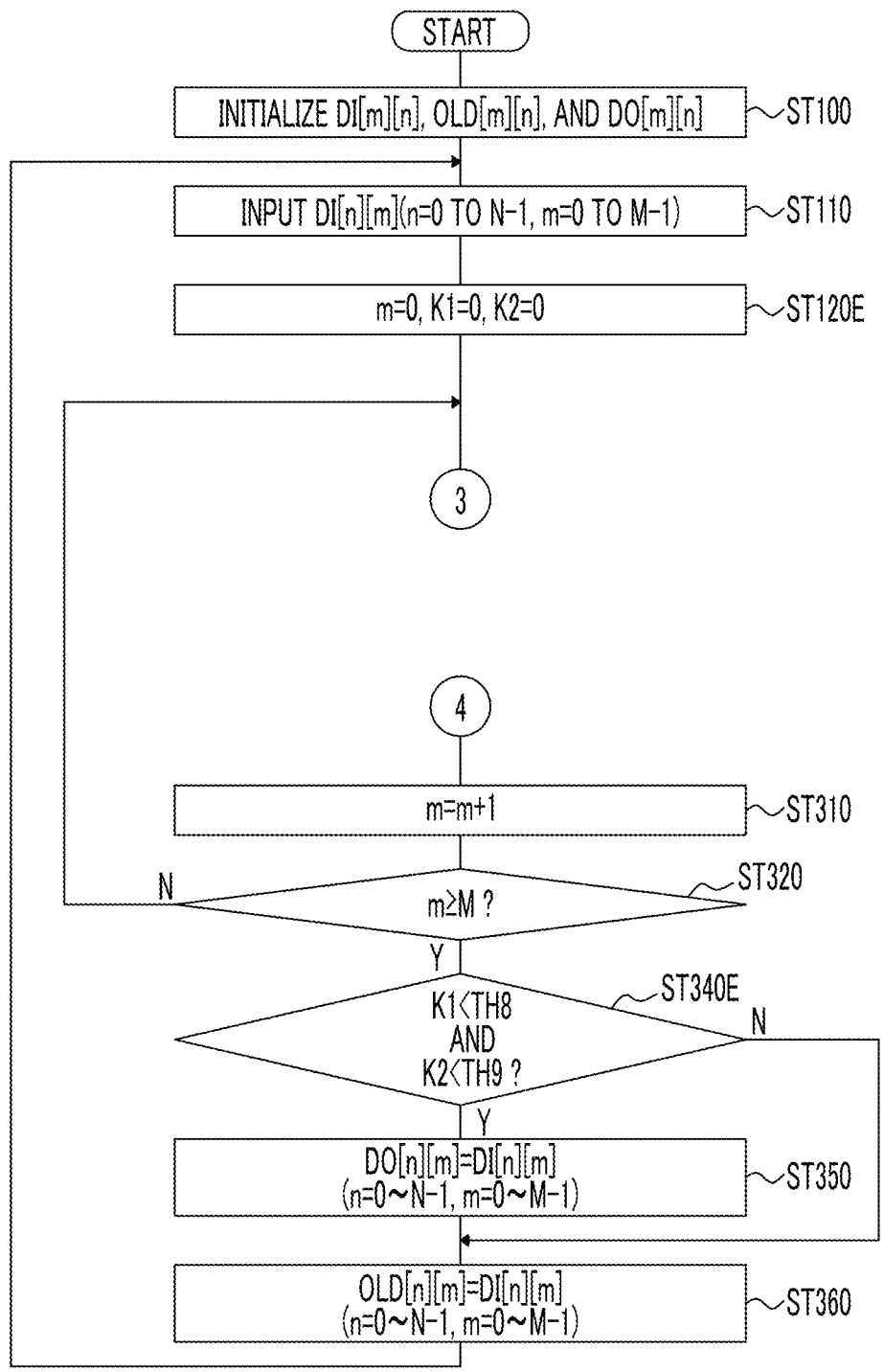
FIG. 9 is a first flowchart illustrating a process related to an error determination of a detection operation and acquisition of detection data in an input device according to a fifth embodiment.
Figure 10:
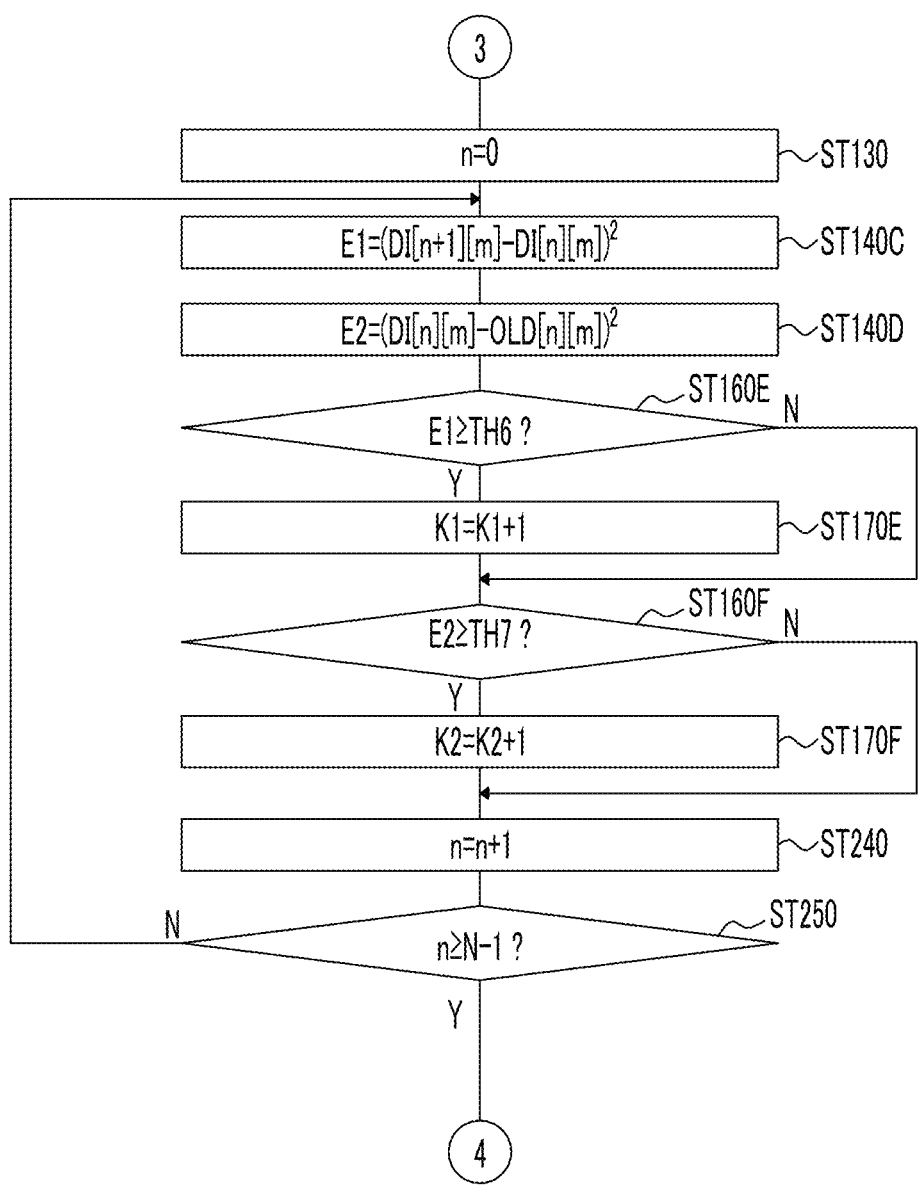
FIG. 10 is a second flowchart illustrating a process related to an error determination of a detection operation and acquisition of detection data in the input device according to the fifth embodiment.

FIGS. 9 and 10 are flowcharts illustrating a process related to an error determination of the detection operation and acquisition of the detection data in the input device according to the fifth embodiment. The flowcharts illustrated in FIGS. 9 and 10 are obtained by changing step ST120C in the flowcharts illustrated in FIGS. 7 and 8 described above to step ST120E, replacing step ST150C with steps ST160E and ST170E, replacing step ST150D with steps ST160F and ST170F, and replacing step ST330C into step ST340E. Other steps are the same as those of the flowcharts illustrated in FIGS. 7 and 8. Here, only the changed or replaced steps will be described.

ST120E: The error determination unit 23 initializes "m" indicating the Y coordinate of the detection position and the count values K1 and K2 to zero.

ST160E and ST170E: The error determination unit 23 compares the first evaluation value E1 calculated in step ST140C with the threshold value TH6, and adds "1" to the count value K1 when the first evaluation value E1 is greater than the threshold value TH6. When the first evaluation value E1 is smaller than the threshold value TH6, the error determination unit 23 maintains the value of the count value K1.

ST160F and ST170F: The error determination unit 23 compares the second evaluation value E2 calculated in step ST140D with the threshold value TH7, and adds "1" to the count value K2 when the second evaluation value E2 is greater than the threshold value TH7. When the second evaluation value E2 is smaller than the threshold value TH7, the error determination unit 23 maintains the value of the count value K2.

ST340E: The error determination unit 23 compares the count value K1 that is the number of detection positions in which the first evaluation value E1 is greater with the threshold value TH6 with the predetermined threshold value TH8, and compares the count value K2 that is the number of detection positions in which the second evaluation value E2 is greater with the threshold value TH7 with the predetermined threshold value TH9. When the count value K1 is smaller than the threshold value TH8 and the count value K2 is smaller than the threshold value TH9, the error determination unit 23 determines that there is no error in the detection operation of the sensor unit 10. When the count value K1 is greater than the threshold value TH8 or the count value K2 is greater than the threshold value TH9, the error determination unit 23 determines that there is an error in the detection operation.

In another modification example, the error determination unit 23 may determine that there is no error in the detection operation of the sensor unit 10 when the count value K1 is smaller than the threshold value TH8 or the count value K2 is smaller than the threshold value TH9, and determine that there is an error in the detection operation of the sensor unit 10 when the count value K1 is greater than the threshold value TH8 and the count value K2 is greater than the threshold value TH9.

In the input device according to the fifth embodiment described above, it is also possible to achieve the same effect as that of the input device according to the first embodiment. That is, it is possible to accurately determine whether or not there is an error in the detection operation due to noise based on a degree of the temporal change in the detection data and a degree of the positional change in the detection data. Further, since the process of acquiring the detection data generated in a cycle in which it is determined that there is an error in the detection operation due to noise is skipped, it is possible to effectively reduce an influence of the detection error due to noise.

While various embodiments of the present invention have been described above, the present invention is not limited to only the above-described embodiments and includes various variations.

For example, each processing block of the processing unit 20 in each embodiment described above may be configured using a computer and a program or may be configured using dedicated hardware.

Further, while the "positional change amount of the detection data" used for calculation of the evaluation value in the error determination unit 23 of each embodiment described above is an amount of a change in only the X direction, this positional change amount may be an amount of a change in only the Y direction, or may be an amount of change for both of the X direction and the Y direction (or multiple directions including three or more directions).

The input device of the embodiment of the present invention is not limited to a user interface device that inputs information using an operation of a finger or the like. That is, the input device of the embodiment of the present invention can be widely applied to devices that input information according to approach of various objects not limited to a human body to the detection surface.

It should be understood by those skilled in the art that various modifications, combinations, sub-combinations and alterations may occur depending on design requirements and other factors insofar as they are within the scope of the appended claims or the equivalents thereof.

What is claimed is:

1. An input device for inputting information according to a state of approach of an object thereto, the input device comprising:
    a detection surface to which the object approaches;
    a sensor unit configured to detect a degree of the approach of the object at each of a plurality of positions of the detection surface, and to generate detection data indicating a result of the detection for each of the plurality of positions;
    a sensor control unit configured to control the sensor unit such that the sensor unit periodically performs a detection operation once in each cycle to generate the detection data for the plurality of positions;
    a detection data acquisition unit configured to acquire once in each cycle the detection data for the plurality of positions generated in the detection operation; and
    an error determination unit configured to determine, in each cycle, whether or not an error has occurred in the detection operation due to noise, by calculating in each cycle, an evaluation value based on a degree of a temporal change in the detection data at a same detection position obtained from a plurality of successive cycles, and a degree of a positional change in the detection data for at least some of the plurality of positions, determining if the calculated evaluation value is greater than a predetermined threshold value at the at least some of the plurality of positions, and determining that an error due to noise has occurred in the detection operation if a number of positions at which the evaluation value is greater than the predetermined threshold value reaches a predetermined number,
    and wherein the detection data acquisition unit skips a process of acquiring the detection data for a current cycle if the error determination unit determines that an error due to noise has occurred in the detection operation in the current cycle.

2. The input device according to claim 1, wherein the error determination unit is further configured to calculate the evaluation value according to a degree of a positional change in the degree of the temporal change in the detection data in each cycle for the at least some of the plurality of positions, by calculating a difference between the temporal change in the detection data at a first position among the at least some of the plurality of positions and the temporal change in the detection data at a second position adjacent to the first position among the at least some of the plurality of positions.

3. The input device according to claim 1, wherein the error determination unit is further configured to calculate the evaluation value according to a degree of a temporal change in the degree of the positional change in the detection data in each cycle for the at least some of the plurality of positions, by calculating a difference between the positional change in the detection data obtained in the current cycle and the positional change in the detection data obtained in the at least one previous cycle, the positional change being a difference between the detection data at a first position among the at least some of the plurality of positions and the detection data at a second position adjacent to the first position among the at least some of the plurality of positions obtained in a same cycle.

4. The input device according to claim 1, wherein the predetermined number is four (4).

5. The input device according to claim 1, wherein the evaluation value greater than the predetermined threshold value indicates a rapid change in the detection data due to electromagnetic noise.

6. A method for controlling an input device executed by a computer, the input device including a detection surface to which an object approaches, and a sensor unit which detects a degree of approach of the object to the detection surface at a plurality of positions thereof and generates detection data indicating a result of the detection for each of the plurality of positions, the method comprising the steps of:
    controlling the sensor unit such that the sensor unit periodically performs a detection operation once in each cycle to generate the detection data for the plurality of positions;
    acquiring once in each cycle the detection data for the plurality of positions generated in the detection operation; and
    determining, in each cycle, whether or not an error has occurred in the detection operation due to noise by:
        calculating, in each cycle, an evaluation value based on a degree of a temporal change in the detection data at a same detection position obtained from a plurality of successive cycles, and a degree of a positional change in the detection data for at least some of the plurality of positions;

determining if the calculated evaluation value is greater than a predetermined threshold value at the at least some of the plurality of positions; and determining that an error due to noise has occurred in the detection operation if a number of positions at which the evaluation value is greater than to the predetermined threshold value reaches a predetermined number, and wherein the step of acquiring the detection data is skipped for a current cycle if the step of determining determines that an error due to noise has occurred in the detection operation in the current cycle.

7. The method according to claim 6, wherein the calculating the evaluation value includes calculating a degree of a positional change in the degree of the temporal change in the detection data in each cycle for the at least some of the plurality of positions, by calculating a difference between the temporal change in the detection data at a first position among the at least some of the plurality of positions and the temporal change in the detection data at a second position adjacent to the first position, and the temporal change being obtained from the detection data in a plurality of successive cycles.

8. The method according to claim 6, wherein the calculating the evaluation value includes calculating a degree of a temporal change in the degree of the positional change in the detection data in each cycle for the at least some of the plurality of positions, by calculating a difference between the positional change in the detection data obtained in the current cycle and the positional change in the detection data obtained in the at least one previous cycle, the positional change being a difference between the detection data at a first position among the at least some of the plurality of positions and the detection data at a second position adjacent to the first position among the at least some of the plurality of positions obtained in a same cycle.

9. The method according to claim 6, wherein the evaluation value greater than the predetermined threshold value indicates a rapid change in the detection data due to electromagnetic noise.

10. An input device for inputting information according to a state of approach of an object thereto, the input device comprising:

a detection surface to which the object approaches;

a sensor unit configured to detect a degree of the approach of the object at each of a plurality of positions of the detection surface, and to generate detection data indicating a result of the detection for each of the plurality of positions;

a sensor control unit configured to control the sensor unit such that the sensor unit periodically performs a detection operation once in each cycle to generate the detection data for the plurality of positions;

a detection data acquisition unit configured to acquire once in each cycle the detection data for the plurality of positions generated in the detection operation; and an error determination unit configured to determine, in each cycle, whether or not an error has occurred in the detection operation due to noise based on a degree of a positional change and a degree of a temporal change in the detection data, wherein the error determination unit is further configured to calculate, in each cycle, a first evaluation value according to an amount of the positional change in the detection data and a second evaluation value according to an amount of the temporal change in the detection data at a same detection position obtained from a plurality of successive cycles for at least some of the plurality of positions, wherein the error determination unit compares the first evaluation value with a first predetermined threshold value and counts a first number of positions at which the first evaluation value is greater than the first predetermined threshold value, and compares the second evaluation value with a second predetermined threshold value and counts a second number of positions at which the second evaluation value is greater than the second predetermined threshold value, wherein the error determination unit determines that an error due to noise has occurred in the detection operation if the first number reaches a first predetermined threshold number or the second number reaches a second predetermined threshold number, and wherein the detection data acquisition unit skips a process of acquiring the detection data for a current cycle if the error determination unit determines that an error due noise has occurred in the detection operation in the current cycle.

11. The input device according to claim 10, wherein the first and second evaluation values greater than the first and second predetermined threshold values, respectively, indicate a rapid change in the detection data due to electromagnetic noise.

12. A method for controlling an input device executed by a computer, the input device including a detection surface to which an object approaches, and a sensor unit which detects a degree of approach of the object to the detection surface at a plurality of positions thereof and generates detection data indicating a result of the detection for each of the plurality of positions, the method comprising the steps of:

controlling the sensor unit such that the sensor unit periodically performs a detection operation once in each cycle to generate the detection data for the plurality of positions;

acquiring once in each cycle the detection data for the plurality of positions generated in the detection operation; and determining, in each cycle, whether or not an error has occurred in the detection operation due to noise based on a degree of a positional change and a degree of a temporal change in the detection data, wherein the step of determining includes:

calculating, in each cycle, a first evaluation value according to an amount of the positional change in the detection data and a second evaluation value according to an amount of the temporal change of the detection at a same detection position obtained from a plurality of successive cycles, for at least some of the plurality of positions;

comparing the first evaluation value with a first predetermined threshold value and counting a first number of positions at which the first evaluation value is greater than the first predetermined threshold;

comparing the second evaluation value with a second predetermined threshold value and counts a second number of positions at which the second evaluation value is greater than the second predetermined threshold; and determining that an error due to noise has occurred in the detection operation if the first number reaches a first predetermined threshold number or the second number reaches a second predetermined threshold number, and wherein the step of acquiring the detection data is skipped for a current cycle if the step of determining determines that an error due to noise has occurred in the detection operation in the current cycle.

13. The method according to claim 12, wherein the first and second evaluation values greater than the first and second predetermined threshold values, respectively, indicate a rapid change in the detection data due to electromagnetic noise.

* * * * *